United States Patent [19]

King

[11] Patent Number: 4,793,665
[45] Date of Patent: Dec. 27, 1988

[54] STORING AND DISPENSING SYSTEM
[75] Inventor: Ronald R. King, Sutton, Mass.
[73] Assignee: Wright Line Inc., Worcester, Mass.
[21] Appl. No.: 34,012
[22] Filed: Apr. 2, 1987
[51] Int. Cl.$^4$ ............................................. A47B 81/06
[52] U.S. Cl. ..................................... 312/17; 211/40; 312/15
[58] Field of Search ................ 312/10, 12, 15, 9, 297; 211/40, 41

[56] References Cited
U.S. PATENT DOCUMENTS

| | | | |
|---|---|---|---|
| 4,441,768 | 4/1984 | Clarkson | 312/297 X |
| 4,600,107 | 7/1986 | Price et al. | 211/41 |
| 4,630,732 | 12/1986 | Snyman | 211/40 X |
| 4,684,027 | 8/1987 | Wright | 211/40 |

Primary Examiner—Joseph Falk
Attorney, Agent, or Firm—Milton E. Gilbert; James W. Mitchell

[57] ABSTRACT

The invention is disclosed as being embodied in the stationary storing and dispensing system for substantially square or rectangular objects and comprises at least two shelves (S) each having a bottom (20), a ramp (32), a finger guide (26), and and article restraining member (30), the shelves being assembled horizontally one above the other.

5 Claims, 3 Drawing Sheets

STORING AND DISPENSING SYSTEM

FIELD OF THE INVENTION

This invention relates to storing and dispensing systems in general, and more particularly to a system for storing and dispensing square or rectangular objects such as video cassettes.

BACKGROUND OF THE INVENTION

With the advent of the video cassette recorder and player, a large industry has developed for the rental of video cassettes with pre-recordings of movies, operas, and the like. Generally speaking, there are two types of cassettes: one termed a VCR which is blank and used for recording. Another called VCP is for playback only and are sold with a prerecording such as a movie. They are intentionally made so that they cannot be recorded on, so that the movie cannot be erased inadvertently.

Initially, video cassette movies were rented through stores specializing in video cassette equipment. "Membership" in the store's "club" was obtained by paying an annual fee, which entitled the member to rent movies for a fee.

This type of entertainment became so popular that cassettes with pre-recorded movies and the like, are now available in supermarkets, drugstores, and for the most part, club membership fees no longer exist.

With the growth of the industry, came a need for inexpensive, efficient means for storing and dispensing the VCP cassettes so that a particular cassette selected by a customer from a catalog, or the like, can be removed by a clerk, presented to the customer, and then a day or so later, returned to its storage place. Since the recorded cassettes are expensive to purchase, it is also advantageous that whatever storage and dispensing system is employed, it be capable of being closed and locked when there is no clerk present.

It was with these objectives in mind that the present invention was conceived.

SUMMARY OF THE INVENTION

The invention is disclosed as embodied in a stationary storing and dispensing system for substantially square or rectangular objects such as cassettes of video tape. The system includes at least two shelves. Each shelf has a bottom with front and rear parallel edges. The bottom is flat and horizontal. A ramp is inclined upwardly at an angle from the rear edge of the bottom. A finger guide extends downwardly and rearwardly at an acute angle from the front edge of the bottom.

There is an article restraining member which projects below the bottom of the shelf and extends lengthwise of the shelf. The article restraining member can be formed to serve the additional function of being a reinforcement to the shelf to resist bending.

The shelves are assembled horizontally, one above the other so that elements of two adjacent shelves serve to assist in removing an article from the shelf. The finger guide on a first shelf may be engaged by at least one finger, while a person removes or inserts an object on a second shelf, which is immediately below the first shelf.

The article restraining member on a first shelf may be engaged by an object on a second shelf, which is immediately below the first shelf, when that object is moved rearwardly and up the ramp in a tilting motion in the process of removing the object. The restraining member limits the amount of tilt.

Each shelf has a rear wall extending upwardly from the ramp to limit the amount that an object on a shelf may be moved up the ramp in the removal or inserting process.

The shelves are removably arranged in a horizontal position, one above another, in a cabinet or the like. The supporting means themselves are adjustable heightwise of the cabinet to adjust the vertical space between shelves.

When arranged in a cabinet, it has been found most practical from a safety and convenience standpoint, that the cabinet be provided with a tambour door. A tambour includes a plurality of horizontal slats pivotally joined one to another, so that the door can be moved from a closed position to an open position while the slats slide upwardly to the back of the cabinet on parallel curved tracks.

The above and other features of the invention including various novel details of construction and combinations of parts, will now be more particularly described with reference to the accompanying Drawings and pointed out in the Claims. It will be understood that the particular storing and dispensing system embodying the invention, is shown by way of illustration only and not as a limitation of the invention. The principles and features of this invention may be employed in varied and numerous embodyments without departing from the scope of the invention.

DETAILED DESCRIPTION OF THE INVENTION

Figure 1:
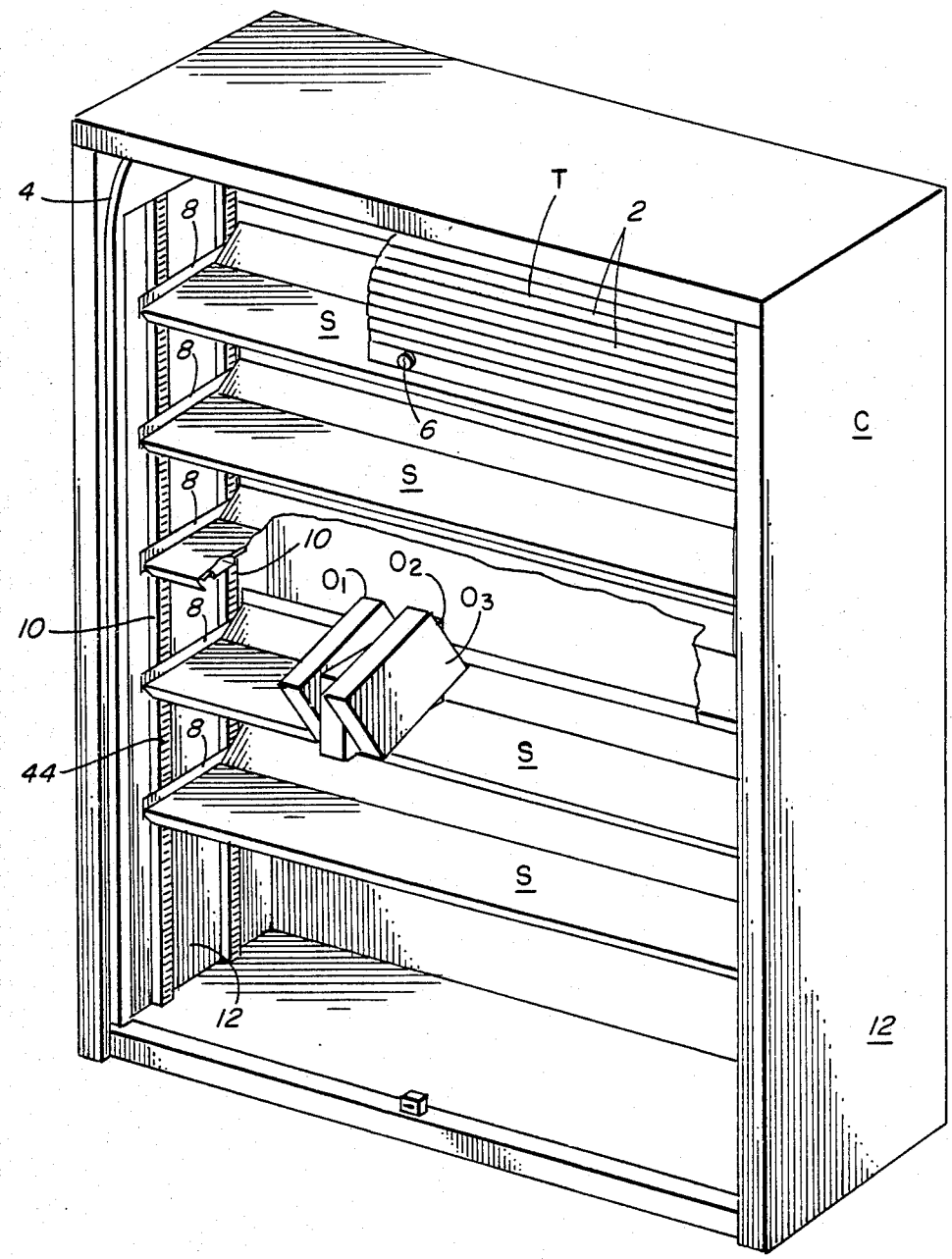
FIG. 1 is a perspective view of a storage cabinet fitted with a stationary storing and dispensing system comprising at least two shelves and shown on reduced scale.

The invention is embodied in a stationary storing and dispensing system which has at least two shelves S. As seen in FIG. 1, a plurality of shelves S are assembled horizontally, one above another, in a storage cabinet C. The front of the cabinet is closed by a tambour closure or door T which is a type of closure having a plurality of horizontally aligned hinged slats 2 which slide in tracks 4 (only one of which is shown) from a closed position to an open position while the tambour closure slides up the track and around to the back of the cabinet C. The tambour closure may, if desired, be provided with a lock 6.

The shelves S are removably supported within the cabinet C by brackets 8 which are positionable heightwise of the cabinet in ladder-like support means 10 which are secured to the inner surfaces of the side walls 12 of the cabinet.

Three representative square or rectangular objects $O_1$, $O_2$ and $O_3$, as for example, video cassettes are shown positioned on one of the shelves within the cabinet. Since the shelves S are adjustable heightwise of the cabinet and removable, space is shown at the bottom of the cabinet whereby other related equipment such as video cassette recorders may be stored.

Figure 2:
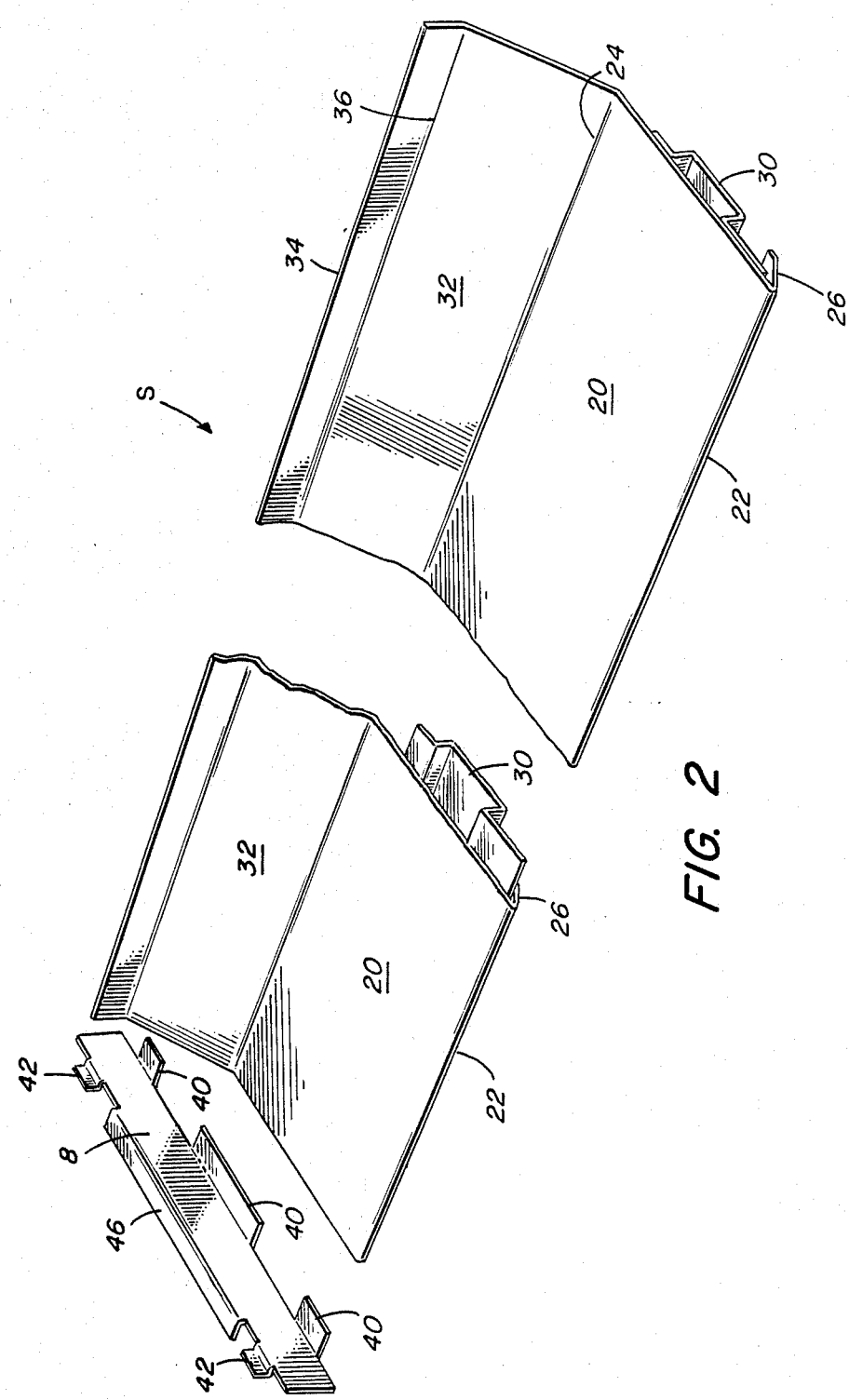
FIG. 2 is a perspective view of one shelf and a supporting bracket, the shelf being partially broken away for clarity, and, FIGS. 3 to 6 are views of a pair of shelves shown schematically and illustrating various ways that an object positioned on the shelves may be removed.

Referring next to FIG. 2, a shelf, per say, will now be described. Each shelf has a bottom 20 with a front edge 22 and a rear edge 24, the edges being parallel. A finger guide 26 extends downwardly and rearwardly at an acute angle from the front edge 22 of the bottom. An article restraining member 30 projects below the bottom 20 of the shelf, and extends lengthwise of the shelf. It is illustrated as a channel section which may be spot welded or otherwise secured to the bottom surface of the shelf, and which serves the additional function of being a stiffening member to prevent the shelves from bending when articles are placed upon them. A ramp 32 extends upwardly at an angle from the rear edge 24 of the bottom at approximately 45°. A vertical rear wall 34 extends upwardly from the top edge 36 of the ramp.

The support means 8 have horizontally extending flanges 40 upon which the shelves S rest. The support means 8 are positioned against the ladder-like means 10 with interlocking, upwardly projecting tabs 42 engageable selectively in mating pairs of slots 44, (FIG. 1) in the vertical ladder-like support means 10.

To change or rearrange the heightwise positioning of the shelves relative to each other, it is only necessary to remove the bracket 8 from the ladders 10 and reposition the tabs 42 in another set of mating slots 44.

Figure 3:
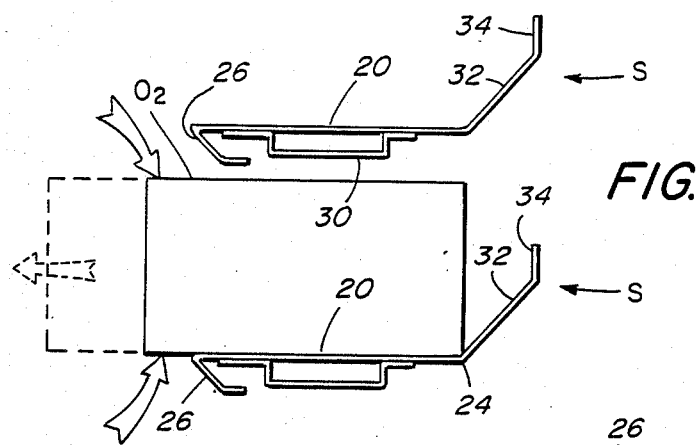

Referring next to FIG. 3, there will be seen a pair of shelves S assembled horizontally one above the other. An object $O_2$ is shown resting on the bottom 20 with its right hand end at the rear edge 24. One way of withdrawing the object $O_2$ is to grasp the top and bottom in the direction of the solid arrows and simply withdraw it in the direction of the dotted arrow to the dotted line position shown in FIG. 3.

The finger guide 26 on the upper shelf has been found to be beneficial when a cartridge is removed in this manner by guiding either the index finger or the middle finger of the hand grasping the top of the article $O_2$ while the thumb grips the bottom.

Figure 4:
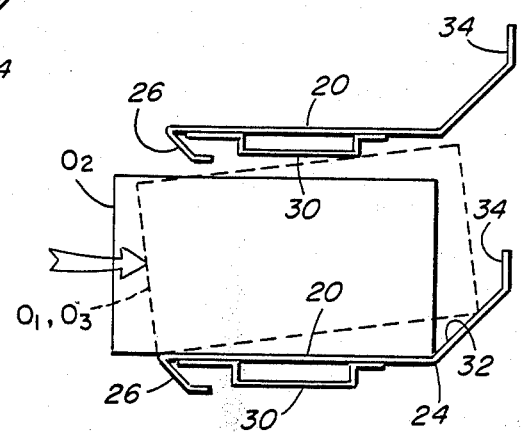

Next referring to FIG. 4, another method of removing a cartridge will be seen. FIG. 4 will be taken in conjunction with the showing of the three cartridges on the shelf in FIG. 1. The desired object $O_2$ is located between two adjacent objects $O_1$ and $O_3$. In order to grip the desired object $O_2$ preferably between thumb and forefinger, the adjacent articles $O_1$ and $O_3$ are pushed rearwardly and will move up the ramp until they either engage the article restraining member 30 on the shelf above, or the rear wall 34 on the shelf that they are resting on. Which of these members the objects engage first will be dependent upon the relative size of the objects and the distance apart that the two parallel shelves are spaced. With objects $O_1$ and $O_3$ pushed rearwardly, the desired object $O_2$ may be gripped between the thumb and forefinger. $O_1$ and $O_3$ will return to the bottom of the shelf by gravity.

Figure 5:
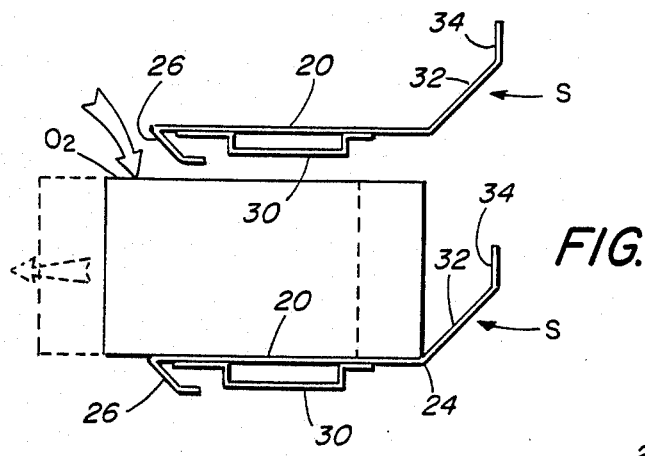

Next referring to FIG. 5, an object $O_2$ may be removed by placing one finger on top of it as shown by the solid arrow and sliding the object directly off the shelf in the direction of the dotted arrow. In this technique, the finger guide 26 is extremely useful.

Figure 6:
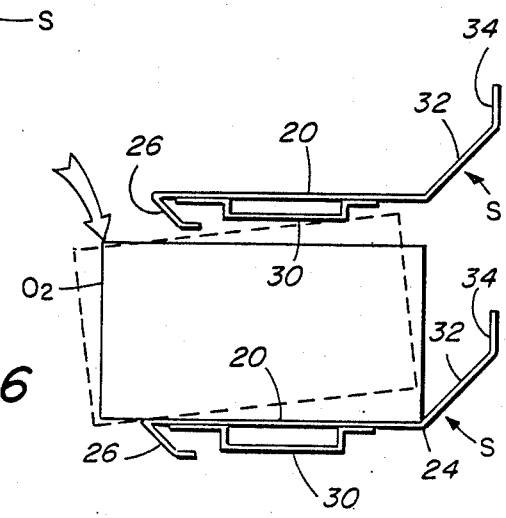

Referring next to FIG. 6, another technique will be seen. It is only necessary to press downward on the desired object $O_2$, in the direction of the solid arrow, which causes the object to tilt from the solid to the dotted line position engaging the bottom of the article restraining member 30. In this position the article may be grasped, as for example, by the other hand or even the thumb and middle finger of one hand if the index finger has been used to depress the desired object.

I claim:

1. A stationary storing and dispensing system for substantially square or rectangular objects comprising:
    at least two shelves,
    each of the shelves having an article engaging bottom,
    the bottom having front and rear continuous parallel edges extending widthwise of the shelf,
    a ramp inclined upwardly at an angle from the rear edge of the bottom and extending widthwise of the shelf,
    a finger guide extending widthwise of the shelf below the bottom,
    the guide being inclined downwardly and rearwardly from the front edge at an acute angle with the bottom of the shelf,
    a continuous, uninterrupted article engaging and restraining member projecting downwardly below the bottom of each shelf, and extending widthwise of the shelf between the finger guide and the ramp,
    the shelves being assembled horizontally, one above the other,
    such that the single finger guide on the upper of two assembled shelves may be engaged at any point widthwise of the shelf by at least one finger to guide it while removing or inserting an object on a shelf immediately below the first shelf, and
    such that the article engaging and restraining member on the upper of the two assembled shelves may be engaged by an object on the shelf immediately below the upper shelf when the object is tilted in the process of removing the object, the engaging and restraining member limiting the amount of tilt.

2. A stationary storing and dispensing system according to claim 1, each shelf having a rear wall extending upwardly from the ramp to limit the amount that an object on a shelf may be moved up the ramp.

3. A stationary storing and dispensing system according to claim 1, wherein there are means for removably supporting the shelves in a cabinet or the like.

4. A stationary storing and dispensing system according to claim 3, wherein there are means for adjusting the support means heightwise of the cabinet to adjust the space between shelves.

5. A stationary storing and dispensing system according to claim 1, wherein the shelves are located in a storage cabinet which is provided with a tambour door.

* * * * *